Dec. 25, 1934.  J. T. KELLY  1,985,349
COUPLING
Filed Jan. 9, 1933

INVENTOR:—
John T. Kelly
BY
Harry H. Hitzeman
ATTORNEY.

Patented Dec. 25, 1934

1,985,349

UNITED STATES PATENT OFFICE 1,985,349

COUPLING

John T. Kelly, Oak Park, Ill.

Application January 9, 1933, Serial No. 650,868

11 Claims. (Cl. 285—67)

My invention relates to couplings for making connections between separate lengths of hose and is more particularly concerned with the provision of a coupling means of this type that is capable of being easily connected or disconnected.

My invention relates more particularly to hose couplings of the class known as "Universal type" hose couplings which are generally formed of a pair of half couplings provided with ears and shoulders which co-operate so that they may be easily and quickly connected together or disconnected by a slight rotary turning movement of the parts.

The principal object of my invention is to provide improved locking means for holding coupling members of this type in a locked position after they have been connected together in the ordinary manner at present well known to those familiar with the art.

A further object of the present invention is to provide an improved resilient locking device which may be easily placed on the connected coupling members to securely lock the same into position.

A further object of the present invention is to provide a resilient or spring-locking device of the type described that may be utilized in connection with any of the well known universal type hose couplings at present on the market.

A further object of the invention is to provide a locking device of the type described that may be permanently connected with one of the coupler parts of a coupling.

A further object is to provide an improved locking means of the class described that will provide a double lock for preventing the unconnecting of a pair of hose couplings.

A further object of the invention is to provide an improved locking device so designed and constructed that when not permanently attached to a coupling half it may be snapped upon one ear of the coupling when not in service and remain there until utilized in locking two halves of couplings together.

A further object of the invention is to provide an improved locking device having a portion which extends between the slightly separated abutting ends of the coupling parts to effectively prevent the uncoupling thereof by the usual passing together and twisting method.

A further object of the invention is to provide a device of this type that may be easily and cheaply manufactured and which will not easily wear out or break even under the hardest usage, and which is particularly adapted to be attached or removed without the use of tools of any kind whatsoever.

Other objects and advantages will be more apparent from the following description wherein reference is had to the accompanying drawing upon which—

Figure 1:
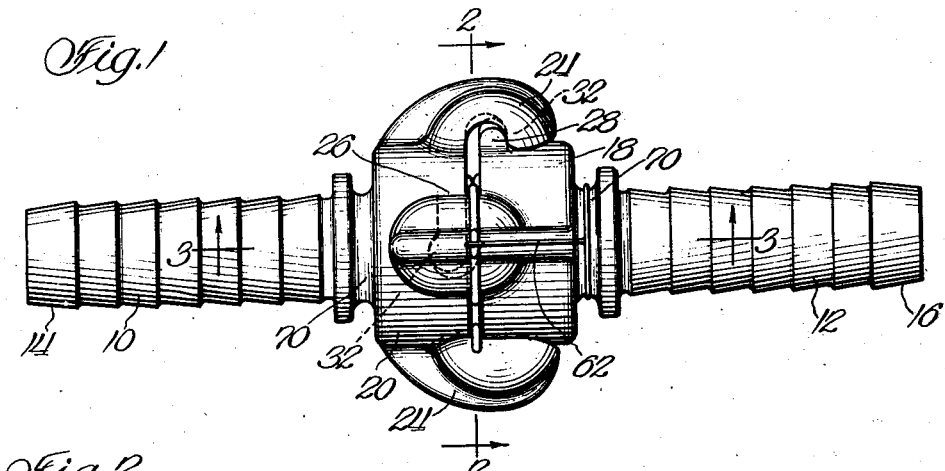
Fig. 1 is a side elevational view of a complete coupling with one of my improved locking units in position.
Figure 2:
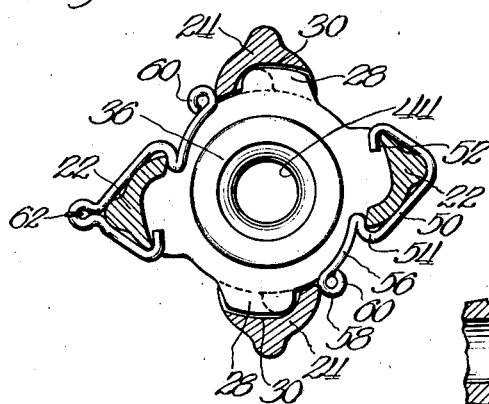
Fig. 2 is a vertical sectional view taken on the line 2—2 of Fig. 1.
Figure 3:
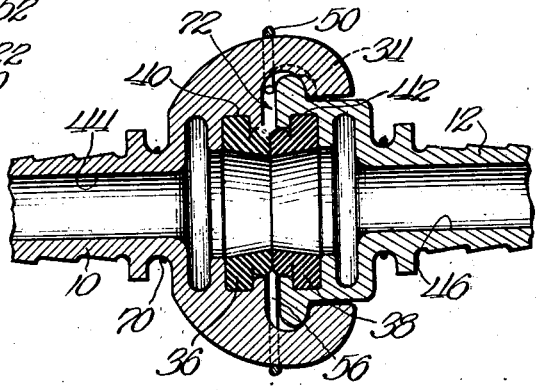
Fig. 3 is a longitudinal sectional view taken generally on the line 3—3 of Fig. 1.

As shown in the drawing, I employ a pair of coupling units 10 and 12 which may be formed with the extensions 14 and 16 by means of which a hose is adapted to be attached to the coupler body portions 18 and 20. The coupler members 10 and 12 may be similar in shape, the unit 10 being formed with the ear portions 22 and the unit 12 being formed with the ear portions 24. Each of the units 10 and 12 is likewise provided with complemental shoulder portions, the unit 10 being formed with the shoulder portions 26 and the unit 12 being formed with the shoulder portions 28. Each of the ear portions 22 and 24 are formed with a cavity or groove portion 30 of a size capable of receiving the shoulder portions 28 of the unit 12.

The shoulders 26 and 28, as clearly shown in dotted lines in Fig. 1, are formed with a raised portion or bump 32 that is adapted to rest when the device is in a fastened position in a slight depression 34 in the groove 30.

A pair of compressible gaskets 36 and 38 are positioned in suitable bores 40 and 42 in the members 10 and 12. These gaskets, after being first compressed, expand slightly when the units are connected together and thus effectively press the bumps 32 into the depressions 34 so that the coupling units are normally locked together by the action of the rubber gaskets.

Suitable passageways 44 and 46 are formed in the coupler units 10 and 12 to form a continuous passageway through the coupling means for air, gas, water or any other material that it is desired to pass through the coupling.

The device as thus described is so constructed that the coupling members may be easily connected and disconnected by a quarter turn of the coupling members in one direction to connect the same, and in a reverse direction to disconnect the same. However, it has been found that both due to the loss of compressibility in gaskets 36 and 38, due to extremely rough usage, shaking and twisting of the hose when subjected to high pressure, and for many other reasons, that the coupling members become shaken loose, the hose is disconnected and thus a loss is caused both in the material passing through the hose as well as in time and energy required to reconnect the same.

When used in handling compressed air, there is also grave danger of injury to workmen due to the whipping action of the hose end when a break or uncoupling takes place. In order to guard against any unwarranted separation of the coupling members either due to carelessness, to wear in materials or to other actions of the hose which may take place during use, I provide a locking means in the form of a spring member 50 which is so formed that the same can be sprung over and snapped upon one of the ears 22 or 24.

The body portion of the spring member may be formed with a pair of inwardly turned hooks 52 and 54 capable of connecting over the edges of the ears 22 and 24 of the couplings. The device is further formed with an extension 56 which in one embodiment of the invention may be arcuately shaped to correspond with the peripheral shape of the coupler portions 20 and 18. The end thereof may be upturned as shown at 58, to provide an abutment against an adjacent ear portion so that when it is desired to rotate the couplers to unfasten the same, the ear portion 58 effectively prevents such movement. The device may further be formed with the loop portion 60 through which a nail or other device may be easily passed to withdraw the spring fastener from one of the ears 22 or 24. It will also be obvious that the device may be grasped at this point between two fingers to remove the same without the use of any tools.

In the event that it is desired to connect one of the locking devices to a coupler half, a wire or string 62 may be connected through the loop 60 and fastened around the annulus 70 of either one of the coupling members 10 or 12.

Figure 4:
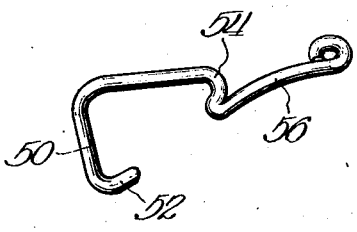
Fig. 4 is an enlarged perspective view of one form of the locking device.
Figure 5:
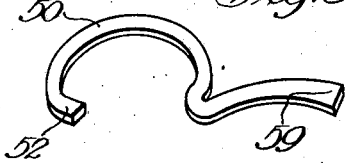
Fig. 5 is a similar perspective view of a modified form thereof.
Figure 6:
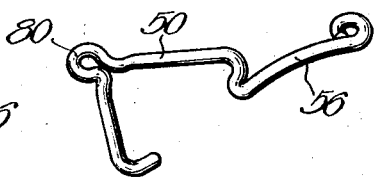
Fig. 6 is a similar perspective view of a still further modified form of the invention.

The locking device may be either round, as shown in Fig. 4, or the same may be flattened to a desired width as shown in Fig. 5. In the embodiment shown in Fig. 6, a loop 80 may be formed in the body portion 50 of the spring member for convenience in fastening the same to a coupling member.

It will be noted that due to the fact that the portion 56 of the device lies in the space 72 between the abutting ends of the coupling members, it is impossible to unfasten the couplers, due to the inability while this is in position of the primary unfastening, to disengage the bumps 32 from the cavities 34. Thus it can readily be seen that an effective double locking action is provided, the first as described, and the second by the abutment of the portion 58 of the device against the edge of an adjacent ear.

In the modified form of the device shown in Fig. 5, the shape thereof has been modified and the loop 60 has been omitted. It will also be noted from the drawing that the end 59 has been enlarged to provide a larger abutment against the edge of the ear. It will be obvious from the showing in the drawing that many other forms of the device may be conceived, and I contemplate that any and all such shapes and structures will come within the purview of the invention. It will be noted that one, or two, or more of these devices may be used upon a coupling connection and it will further be evident that several may be made from a continuous length of wire bent to a suitable or desired shape.

While I have illustrated and described a specific embodiment of the invention, it will be understood that many modifications and changes may be made therefrom, and I do not wish to limit myself to the specific embodiment shown. Rather, what I desire to secure and protect by Letters Patent of the United States is:

1. A removable locking device of the type described, capable of being snapped over one of the ears of a coupling, said device provided with an arcuately extending portion adapted to abut against the ear portion of an adjoining coupling to prevent relative rotary movement toward each other of said ear portions.

2. A removable locking device of the type described, having an arched body portion capable of being snapped over one of the ears of a coupling member, said device provided with an arcuately extending portion adapted to abut against the ear portion of an adjoining coupling to prevent relative rotary movement toward each other of the ear portions of connected coupling members.

3. A removable locking device of the type described, comprising an arcuately shaped spring member having a pair of inwardly turned ends and being capable of being snapped over the ear of a coupling with an extension from one of said ends capable of abutting against the ear of an adjacent coupling member.

4. A removable locking device of the type described, comprising a spring member having a pair of inwardly turned ends and being capable of being snapped over the ear of the coupling with said ends engaging below said ear, and an extension from one of said ends capable of abutting against the ear of an adjacent coupling member.

5. A locking device for securing together the ends of base couplings comprising a spring member having an arcuately shaped body portion with a pair of inwardly turned ends, and a portion extending outwardly from one of said ends, said article further having a loop formed on the upper side of the arcuate portion.

6. A locking device for securing together the ends of hose couplings, comprising a flattened spring member having a pair of inwardly extending ear portions, a portion extending outwardly from one of said ear portions, said portion formed with a loop at its outer end.

7. A removable locking device of the type described, comprising a spring member having a pair of inwardly turned ends and being capable of being snapped over the ear of the coupling with said ends engaging below said ear, an extension from one of said ends capable of abutting against the ear of an adjacent coupling member, and a loop formed at the end of said extension.

8. A removable locking device of the type described, comprising a spring member having a pair of inwardly turned ends and being capable of being snapped over the ear of the coupling with said ends engaging below said ear, an extension from one of said ends capable of abutting against the ear of an adjacent coupling member, said spring member having a loop formed therein for attachment to a suitable supporting wire.

9. A removable locking device of the type described, comprising an arcuately shaped spring member having a pair of inwardly turned ends and being capable of being snapped over the ear of a coupling with an extension from one of said ends capable of abutting against the ear of an adjacent coupling member, said end being flattened and widened to provide a means for grasping between the fingers to remove the same.

10. The combination of a pair of hose coupler members, having recesses in their associated ends, a pair of gaskets seated in said recesses to provide an air-tight fit therebetween, a pair of ears on each of said coupling members, a pair of complementary shoulders on each of said coupling members, said shoulders and ears adapted to co-operate to lock said coupling members together by a rotary movement of said members, removable spring means capable of placement on one of said ear members for operation upon an adjoining ear member to prevent rotary movement of said couplers to unlock the same, and a chain secured to one of said coupler members, said chain connected to said removable spring means.

11. The combination of a pair of hose coupler members, having recesses in their associated ends, a pair of gaskets seated in said recesses to provide an air-tight fit therebetween, a pair of ears on each of said coupling members, a pair of complementary shoulders on each of said coupling members, said shoulders and ears adapted to co-operate to lock said coupling members together by a rotary movement of said members, removable spring means capable of placement on one of said ear members for operation upon an adjoining ear member to prevent rotary movement of said couplers to unlock the same, and flexible means interconnecting said removable spring with one of said coupler members.

JOHN T. KELLY.